(12) United States Patent
Husveg

(10) Patent No.: US 8,622,075 B2
(45) Date of Patent: Jan. 7, 2014

(54) FLUID FLOW CONTROL VALVE

(75) Inventor: Trygve Husveg, Bryne (NO)

(73) Assignee: Typhonix AS, Bryne (NO)

( * ) Notice: Subject to any disclaimer, the term of this patent is extended or adjusted under 35 U.S.C. 154(b) by 596 days.

(21) Appl. No.: 12/864,500

(22) PCT Filed: Jan. 23, 2009

(86) PCT No.: PCT/GB2009/000188
§ 371 (c)(1),
(2), (4) Date: Oct. 11, 2010

(87) PCT Pub. No.: WO2009/093035
PCT Pub. Date: Jul. 30, 2009

(65) Prior Publication Data
US 2011/0017306 A1    Jan. 27, 2011

(30) Foreign Application Priority Data

Jan. 25, 2008 (GB) .................................. 0802471.4

(51) Int. Cl.
*F16K 3/24* (2006.01)
(52) U.S. Cl.
USPC ........................ 137/219; 137/625.3; 137/808
(58) Field of Classification Search
USPC ...................... 137/219, 625.3, 808
See application file for complete search history.

(56) References Cited

U.S. PATENT DOCUMENTS

| 325,001 | A | 11/1928 | Shaffer |
| 2,598,187 | A | 5/1952 | Meyer |
| 3,007,542 | A | 11/1961 | Giampapa et al. |
| 3,458,170 | A | 7/1969 | Vogeli |
| 3,780,767 | A * | 12/1973 | Borg et al. ................. 137/625.3 |
| 4,126,294 | A * | 11/1978 | DeFrees .......................... 251/99 |
| 4,384,592 | A | 5/1983 | Ng |
| 4,585,465 | A | 4/1986 | Suzuki et al. |
| 5,012,841 | A | 5/1991 | Kueffer |
| 5,043,177 | A | 8/1991 | Chimel et al. |
| 5,145,256 | A * | 9/1992 | Wiemers et al. ............. 366/336 |
| 5,605,172 | A | 2/1997 | Schubert et al. |
| 6,730,236 | B2 | 5/2004 | Kouba |

(Continued)

FOREIGN PATENT DOCUMENTS

DE    9320686        11/1994
EP    0 075 212 A2   3/1983

(Continued)

OTHER PUBLICATIONS

Supplementary European Search Report for EP 06 76 9461, completed Aug. 13, 2009.

*Primary Examiner* — John Fox
(74) *Attorney, Agent, or Firm* — Knobbe, Martens, Olson & Bear, LLP

(57) ABSTRACT

The invention provides a fluid flow control valve (1) comprising a cylindrical inlet chamber (2) having a fluid inlet aperture (3) and a coaxial waisted cylindrical outlet chamber (4) having a fluid outlet aperture (5), said inlet chamber containing a coaxial cylindrical cage (6) opening into said outlet chamber and said cage having in its cylinder wall at least one valve aperture (7) to allow fluid to pass from said fluid inlet aperture into said outlet chamber, said control valve further comprising a coaxial cylindrical plug (10) movable axially relative to said cage to close and open said valve aperture and a valve actuator (9, 11, 12, 13) operable to move said plug or cage relative to each other whereby to close or open said valve aperture, wherein said valve aperture is arranged to provide fluid exiting said cage from said inlet chamber with a velocity component tangential to the cylindrical axis (31) of said cage.

8 Claims, 5 Drawing Sheets

(56) References Cited

U.S. PATENT DOCUMENTS 7,011,101 B2 * 3/2006 Bowe et al. .............. 137/14
7,494,535 B2 * 2/2009 Betting et al. ............ 96/389

FOREIGN PATENT DOCUMENTS

| | | |
|---|---|---|
| EP | 0 715 871 A2 | 6/1996 |
| FR | 2 588 778 A1 | 4/1987 |
| GB | 600225 A | 4/1948 |
| JP | 64-069869 | 3/1989 |
| JP | 7-317921 | 12/1995 |
| WO | WO 02/084154 | 10/2002 |
| WO | WO 2004/001260 A1 | 12/2003 |
| WO | WO 2006/070020 | 7/2006 |
| WO | WO 2006/089948 | 8/2006 |
| WO | WO 2007/024138 | 3/2007 |

* cited by examiner

# FLUID FLOW CONTROL VALVE

CROSS REFERENCE TO RELATED APPLICATIONS

This application claims the benefit and priority to and is a U.S. National Phase of PCT International Application Number PCT/GB2009/000188, filed on Jan. 23, 2009, which claims priority to UK Patent Application No. GB 0801471.4 filed on Jan. 25, 2008. The disclosures of the above-referenced applications are hereby expressly incorporated by reference in their entirety.

This invention relates to a fluid flow control or choke valve, more particularly a valve for controlling pressure and flow of a two or more phase fluid comprising for example a continuous (e.g. oil or gas) phase and a discontinuous (e.g. water or oil droplet) phase, and to a method of controlling pressure and flow rate of a fluid using such a valve.

In the production and handling of hydrocarbons, e.g. from an oil well, water is frequently present with and hence needs to be separated from the hydrocarbons. Before separation is completed, it may be necessary to control the flow of water containing entrained liquid and gaseous hydrocarbon droplets or bubbles, or liquid hydrocarbon containing entrained water droplets and gas bubbles, or gaseous hydrocarbon containing entrained water or oil droplets, etc. Since separation of the entrained droplets is more difficult with smaller droplets, it is important that the handling procedure should not itself cause droplet fragmentation. Equally, in the handling of produced water from hydrocarbon wells it is important not to cause further fragmentation of entrained oil droplets as produced water has to be substantially free of entrained oil droplets before it is returned to the environment. Conventional fluid flow control or choke valves, during fluid flow regulation (e.g. valve closure and opening) can expose the flowing fluid to high shear forces which cause droplet fragmentation and Typhonix AS, in WO2007/024138 (the contents whereof are incorporated herein by reference), has proposed the use of a control valve in which a rotational flow pattern is imparted to the incoming fluid at the position at which flow rate is altered by the operation of the valve. This is achieved by having the fluid enter a cylindrical inlet chamber through a tangential inlet aperture which can be closed off by axial movement of a piston within that chamber. The rotating fluid passes from an open end of the inlet chamber through a coaxial waisted cylindrical outlet chamber and out of the valve through an outlet aperture in the outlet chamber.

The terms "control valve" and "choke valve" generally refer to the location within the fluid handling system at which the valves are situated and the functions that they perform. For convenience, the term "control valve" will be used hereinafter to refer to both.

We have now found that control valve performance is enhanced by the use of a valve comprising an apertured member movable relative to a surface between an open position in which fluid flow through the aperture(s) is permitted and a closed position in which such flow is reduced or eliminated and wherein the aperture is angled to impart a rotational component to the velocity of the fluid flowing therethrough. In one preferred format, this is achieved by positioning a "plug and cage" valve having tangential apertures in the "cage" between the inlet and outlet chambers with a piston serving as the "plug" to shut off flow by closing the apertures in the "cage".

With this modification of the cage, energy loss by the fluid transitting the valve is mainly dissipated by virtue of the swirling flow in the outlet chamber and does not result in significant droplet fragmentation.

Thus viewed from one aspect the invention provides a fluid flow control valve comprising a cylindrical inlet chamber having a fluid inlet aperture and a coaxial waisted cylindrical outlet chamber having a fluid outlet aperture, said inlet chamber containing a coaxial cylindrical cage opening into said outlet chamber and said cage having in its cylinder wall at least one valve aperture to allow fluid to pass from said fluid inlet aperture into said outlet chamber, said control valve further comprising a coaxial cylindrical plug movable axially relative to said cage to close and open said valve aperture and a valve actuator operable to move said plug or cage relative to each other whereby to close or open said valve aperture, wherein said valve aperture is arranged to provide fluid exiting said cage from said inlet chamber with a velocity component tangential to the cylindrical axis of said cage.

In the control valve of the invention, the outlet chamber, in the flow path from the cage to the waist (i.e. the waisted portion where the cross-sectional area of the outlet chamber is at its smallest), is preferably substantially free from intrusive structural elements. Alternatively put, it is preferred that on this flow path the volume filled by fluid extends fully from the inner wall of the outlet chamber to the axis of the outlet chamber. In this way, this volume can be used for energy dissipation, while extra turbulence, which can cause noise, vibration and droplet fragmentation, is avoided.

The term "cylindrical" as used herein is not restricted to forms having purely circular cross-sections and, insofar as the inlet and outlet chambers of the control valve are concerned, is also not restricted to forms having side walls parallel to the axis. Thus for example the cross-section may be elliptical and, for the inlet and outlet chambers, the side walls may converge towards or diverge away from the axis. Circular or substantially circular cross-sections are however preferred. Likewise the term "coaxial" as used herein for two or more items does not require the axes of the items to be identical: they should be in substantially the same direction and substantially adjacent. True coaxiality however is preferred.

In one embodiment of the control valve, the fluid inlet aperture may be arranged to cause fluid entering the inlet chamber to rotate about the cylindrical axis before passing through the valve aperture(s) and into the cage. Thus, both the fluid inlet aperture and the valve aperture may be arranged to provide a tangential velocity component and that these components are in the same sense (i.e. the same rotational direction).

In an alternative embodiment of the control valve, the inlet to the inlet chamber may be axial and the inner walls of the inlet chamber may be provided with structures serving to impart rotational motion to the fluid upstream of the cage. Such structures may for example be vanes, or more preferably spiral grooves and/or ridges on the outer surface of the housing for the plug driving mechanism. Likewise such structures may be vanes or the like connecting or disposed between the outer surface of the housing and the inner surface of the outer wall of the inlet chamber. In these cases, the cage may have apertures which are radially rather than tangentially oriented, generally relatively large apertures so as not to break the rotational motion already imparted to the flowing fluid, or indeed the cage may be omitted with flow increase/reduction being effected simply by axial motion of the plug. The use of tangential apertures in the cage, aligned with the rotational motion already imparted to the flowing fluid, is however much preferred. Thus viewed from a further aspect the invention also provides a control valve comprising: a cylindrical inlet chamber having an axially disposed fluid inlet aperture;

and a coaxial cylindrical outlet chamber having a fluid outlet aperture; said inlet chamber containing a housing for a plug itself axially movable to prevent fluid flow from said inlet chamber to said outlet chamber; characterised in that a surface contacted by fluid flowing over said housing, e.g. the external surface of said housing, is shaped to impart rotational motion to fluid flowing from said inlet chamber to said outlet chamber.

In general, the control valves of the invention may be "in-line" valves in which the fluid inflow direction is coaxial with the cage, or "angled" in which the inflow direction is at an angle, typically about 90°, to the cage axis. For angled valves, it is generally preferred that the cage extend the length of the interior of the inlet chamber, in which case the fluid inlet aperture will serve to introduce entering fluid directly into the annular space between the internal wall of the inlet chamber and the external wall of the cage. In this configuration it is preferred that the inlet aperture be disposed to introduce fluid into this annular space in a tangential direction. However, for in-line valves, it is preferred that the cage does not extend this full length and that the fluid inlet aperture is positioned to introduce fluid into the inlet chamber at or near the end remote from the cage and the outlet chamber, preferably along the cylindrical axis of the inlet and outlet chambers.

The cage is preferably provided with a plurality of valve apertures, e.g. up to 100 or more, and these are preferably distributed in a rotationally symmetric manner. The cross-sectional areas of the apertures may be uniform; alternatively they may increase (or decrease) along the cylindrical axis. Likewise the number of apertures per unit length of axis may be uniform or may vary. In this way the rate of onset or cut-off of fluid flow by motion of the plug may be roughly constant Or may be accelerated or decelerated. Where the number of valve apertures is particularly high, the cage wall may have a mesh-like appearance.

The apertures in the cage wall may readily be formed by drilling or cutting through the cage wall, preferably in a tangential direction. Other conventional methods of producing apertures may of course be used.

As used herein "tangential direction" means a direction which neither intersects the cylindrical axis nor is parallel thereto. Preferably it is perpendicular to the axis and preferably it is substantially perpendicular to a radius. While the apertures may be aligned to cause the flow direction therethrough to be in the plane of the inlet chamber or cage respectively, they may if desired be angled such that the flow direction has a component in the axial direction, preferably towards the outlet chamber.

The apertures in the cage may be of any desired cross-sectional shape, e.g. circular, regular polygonal, or elongate, for example elliptical or slit-like. The cross-section is preferably smooth and the apertures are preferably slit-like or circular in cross-section-forms which may readily be achieved by cutting or drilling. Where the apertures are elongate in cross-section, e.g. slit-like, the elongation is preferably at least partially and more preferably at least majoratively in the axial direction of the cage.

The edges of the apertures, especially at the outer surface of the cage, will desirably be smoothed. Moreover, the cross-sectional area of the apertures may increase or, preferably, decrease on passing from the outside of the cage to the inside, e.g. they may be substantially frustroconical. The edge of the aperture at the furthest from the axis of the cage is preferably substantially tangential at its entrance into the interior of the cage.

Where the apertures are tangentially oriented, the angle between the flow axis through the aperture in the plane perpendicular to the cage axis and the radius to the centre of the aperture at the cage wall from the cage axis is preferably as close to 90° as possible while allowing the edge of the aperture at the furthest from the axis of the cage to be substantially tangential at its entrance into the interior of the cage. Typically this angle will be up to 88°, for example up to 86° or up to 85°. It is preferably at least 10°, more preferably at least 20°, especially at least 30°, more especially at least 35°, particularly at least 70°. Thus for example it may be 5 to 85°, especially 10 to 80°, e.g. 35 to 70°. It is also preferred that the apertures be axially oriented, i.e. that the angle between the flow axis through the aperture and a plane perpendicular to the cage axis at the centre of the aperture at the cage wall is greater than 0°, preferably 5 to 70°, particularly 10 to 60°, e.g. 10 to 50°. Any such axial orientation is preferably in the flow direction from the cage. In this way, the turbulence in the cage region, and any resultant droplet fragmentation, may be minimised. The use of a cage with apertures that are both tangentially and axially oriented is novel and plug and cage valves with such apertures form a further aspect of the invention. In these valves, the outlet chamber is preferably, but not essentially, waisted.

In the control valve, the cage may be an open-ended cylinder or may be closed at the end remote from the outlet chamber. The latter form is preferred when the plug is disposed outside the cage and the former when the plug is disposed within the cage.

The inner circumference at the outlet chamber end of the cage, or of the plug where the plug is disposed outside the cage, is preferably substantially flush with the inner circumference of the inlet end of the outlet chamber. The cage and the outlet chamber or the plug and the outlet chamber respectively may be held together, or alternatively the cage or the plug respectively may be an integral portion of the inlet end of the outlet chamber.

As mentioned above, in an "angled flow" embodiment of the invention, the inlet aperture is also preferably in a tangential direction, e.g. as shown in WO2007/024138, and in the control valve is preferably at the end of the inlet chamber remote from the outlet chamber. Two or more such inlet apertures may be provided so that fluid enters at two or more, preferably uniformly circumferentially spaced, points. In an alternative and preferred "in-line" embodiment of the control valve of the invention, the inlet aperture is preferably at the end of the inlet chamber aligned to produce an inlet flow direction parallel to the axis. In this embodiment, the inlet aperture is preferably on the cylindrical axis.

Where it is disposed within the cage, the plug may be driven along the inside of the cage by the valve actuator by any convenient means, e.g. by a rod penetrating the end of the inlet chamber through a sealed aperture. Where it is disposed outside the cage in the control valve, the plug is preferably an open-ended cylinder and the cage may likewise be driven along the inside of the plug by the valve actuator. Operation of the valve actuator may be manual or, more preferably, by a drive motor. Thus for example the rod and the aperture in the inlet chamber through which it passes may be threaded so that rotation of the rod from outside causes the plug to advance or retract. Alternatively, the plug may be advanced or retracted without rotation.

It is preferred for all of the valves of the invention that axial motion of the plug and/or cage be sufficient essentially to cut off fluid flow through the valve. It is also preferred that in all of the valves of the invention the valve apertures in the cage should all be tangential. In general, it is preferred that the cage be static and that the plug be movable to open or close the valves of the invention.

The cage, plug and chambers may have a circular cross-section, or less preferably a non-circular cross-section, e.g. an elliptical or smoothed polygonal cross-section. Where plug and cage have non-circular cross-sections, plug or cage advancement/retraction will not involve plug or cage rotation.

As mentioned above, the outlet chamber in the control valve is of waisted cylindrical form. By this is meant that the internal cross-sectional area decreases and then increases in the flow direction. The internal diameter at the waist is preferably from 10 to 90% of the internal diameter at the inlet of the outlet chamber, especially 20 to 50%. The maximum internal diameter of the outlet chamber downstream of the waist is preferably 10 to 200% of the internal diameter at the inlet of the outlet chamber, especially 20 to 150%, more especially 50 to 150%. The ratio of axial length from inlet to waist to waist to outlet aperture is preferably 0.1:1 to 10:1, more preferably 0.2:1 to 10:1, particularly 0.2:1 to 5:1, e.g. 0.5:1 to 5:1. The internal surface in the flow direction may be a stepped linear form but preferably is smoothly curved.

To prevent undesired shear forces on the fluid that has passed through the valve apertures, it is particularly preferred that the internal region from the entry to within the cage to the waist of the outlet chamber be free of valve components intruding into or constraining flow of the fluid. Likewise it is preferred that the side wall of this region in the flow direction should be substantially smooth, i.e. that there should be no sharp stepwise reduction in cross-sectional area. The internal surface roughness should preferably be kept to a minimum.

The ratio of the internal diameter at the inlet of the outlet chamber to the internal length of the outlet chamber is preferably 1:1 to 1:20, especially 1:2 to 1:10.

The inner surface of the valve will generally be smooth in the axial direction between the downstream end of the cage and the exit of the outlet chamber. In the axial direction, the waist occurs between these two end points and the smooth surface may change in the flow direction from parabolic to hyperbolic. If along this surface, the point of minimum diameter (the waist) is designated B, the end of the cage A, the exit of the outlet chamber C, and a point outside the valve on a radius from the cylindrical axis through B is designated D, then angle ABD is preferably 10-85°, especially 20-80°, particularly 30-70°, and angle CBD is preferably 40-87°, especially 50-85°, particularly 60-80°. Hence the angle ABC is preferably 50-172°, especially 70-165°, particularly 90-150°.

The fluid outlet aperture in the outlet chamber is preferably at the end remote from the inlet end. The aperture may be in the end of the chamber, preferably at the axis, or alternatively it may be in the side wall. If the outlet aperture is off-axis, it is preferably oriented to remove fluid from the outlet chamber in a tangential direction. It is particularly preferred that the end of the outlet chamber remote from the inlet chamber be the outlet aperture.

A vortex breaker is preferably positioned in or after the outlet chamber so as to remove the rotational motion of the exiting fluid. Such a breaker may take the form of a set of plates or tubes parallel to the cylinder axis or mean flow direction. Where a vortex breaker is positioned within the outlet chamber, it is preferably positioned downstream of the waist so as to avoid generating turbulence in the volume upstream of the waist.

It is especially preferred that the vortex breaker comprise surfaces (e.g. axially and radially extending vanes) having an angle to the axis of the outlet chamber that decreases in the flow direction and which, were flow to be reversed, would impart a rotational motion to a linearly flowing fluid. Such vanes are significantly more effective than simple planar surfaces aligned parallel to the axis. Thus for example tests have shown that the noise level during operation may be reduced by a quarter or more. Desirably, the surfaces are aligned such that at their upstream end they are close to parallel (e.g. within 10°) to the "helical" flow direction of the fluid reaching them from the waist, and that at their downstream end they are close to parallel to the axis. In this way, the transfer from rotating to linear flow may be achieved most smoothly and with the minimum of noise and vibration.

The control valves are preferably provided with external flanges about the inlet and outlet apertures so that fluid may be fed into the valve and removed from the valve through conduits attached to those flanges.

If desired, the valves may include a further valve upstream of the fluid inlet aperture or downstream of the fluid outlet aperture.

The cage, plug and chambers will typically be of plastics or, more preferably, metal, e.g. carbon or stainless steel, cast or forged steel, or cast iron, optionally together with an erosion resistant surface or surface coating such as tungsten carbide, titanium carbide, polycrystalline diamond, or a ceramic.

As mentioned above, the valves of the invention are particularly suited for use in controlling flow of two or three phase fluids, e.g. emulsions and dispersions, for convenience referred to herein as emulsions. The valves are especially suited for use with gases with entrained liquid droplets or from which liquid droplets are released on passage through the cage, and for use with liquids with entrained liquid droplets.

Thus viewed from a further aspect the invention provides a method of altering flow rate or pressure of an emulsion through a conduit comprising a valve by operation of said valve, characterized in that said valve is a valve according to the present invention.

In the method of the invention, the emulsion is preferably a hydrocarbon-in-water emulsion (e.g. produced water), a water-in-hydrocarbon emulsion, or a liquid in gas dispersion (e.g. an aerosol). In the method, the conduit preferably connects the valve to an upstream and/or downstream phase separator, e.g. a gravity or cyclone separator.

In the control valve of the invention, the cyclonic flow towards the waist in the outlet chamber contributes substantially to the overall pressure drop, thus permitting a lesser pressure drop on transitting the cage and thereby causing less droplet fragmentation for the same overall pressure drop. Thus the combination of the waist and a downstream vortex breaker results in an overall reduction in turbulence in the cage region during valve operation. The avoidance of structural elements in the flow from cage to waist further contributes to this avoidance of turbulence and improvement of valve function. Likewise, the use of apertures which are both tangentially and axially oriented results in lower pressure drop on transitting the cage and less turbulence in the region from cage to waist. As a result of the combination of two or more of these features, the control valve is thus suited for use with fluids with entrained droplets of either higher or lower density.

While the invention has thus far been described in terms of a control valve having an inlet chamber into which fluid enters before passing through a cage, the principles behind it are also applicable to other valves having an apertured member as discussed above and such valves also form part of the invention.

Thus viewed from a further aspect the invention provides a control valve comprising a cylindrical inlet chamber having an outlet aperture at one end and an inlet aperture in the side wall and containing a coaxial cylindrical plug and a coaxial cylindrical cage which has a valve aperture in its side wall and is open at the end adjacent the said outlet aperture, wherein said plug is axially movable to permit or prevent fluid flow from said inlet aperture through said valve aperture and out through said outlet aperture, characterized in that said valve aperture is oriented in a tangential direction.

In this format of the control valve, the plug and cage may be two separate coaxial structures, with the axial movement of the plug serving to open or close the valve apertures in the cage. Preferably, however, the plug and cage are integrally formed with axial movement serving to move the cage into or out of a position in which fluid may pass through the inlet aperture, the valve aperture and the outlet aperture.

The preferred aspects which have been described above for the control valves of the invention, e.g. aspects of cage and outlet chamber construction, and which are compatible with the this valve format are also preferred with this valve format.

In general, the invention extends to all valves having an inlet chamber, a waisted outlet chamber, a valve member movable over the surface of an apertured member to prevent fluid flow through said apertured member and into the outlet chamber, and means to cause fluid flowing through the apertured member to have a rotational movement.

Since the valves of the invention reduce droplet fragmentation, one result is that the effective viscosity of the fluid downstream of the valve is less than with a conventional valve making the valves of the invention particularly suitable for use with more viscous liquids, for example heavy crude oils, since the energy needed to cause the liquids to flow is reduced and the need for drag-reducing chemical additives is reduced or avoided. The valves are thus particularly suitable for use as subsea choke valves, e.g. upstream of risers and transportation pipelines.

The invention will now be described further with reference to the accompanying drawings, in which.

Figure 6:
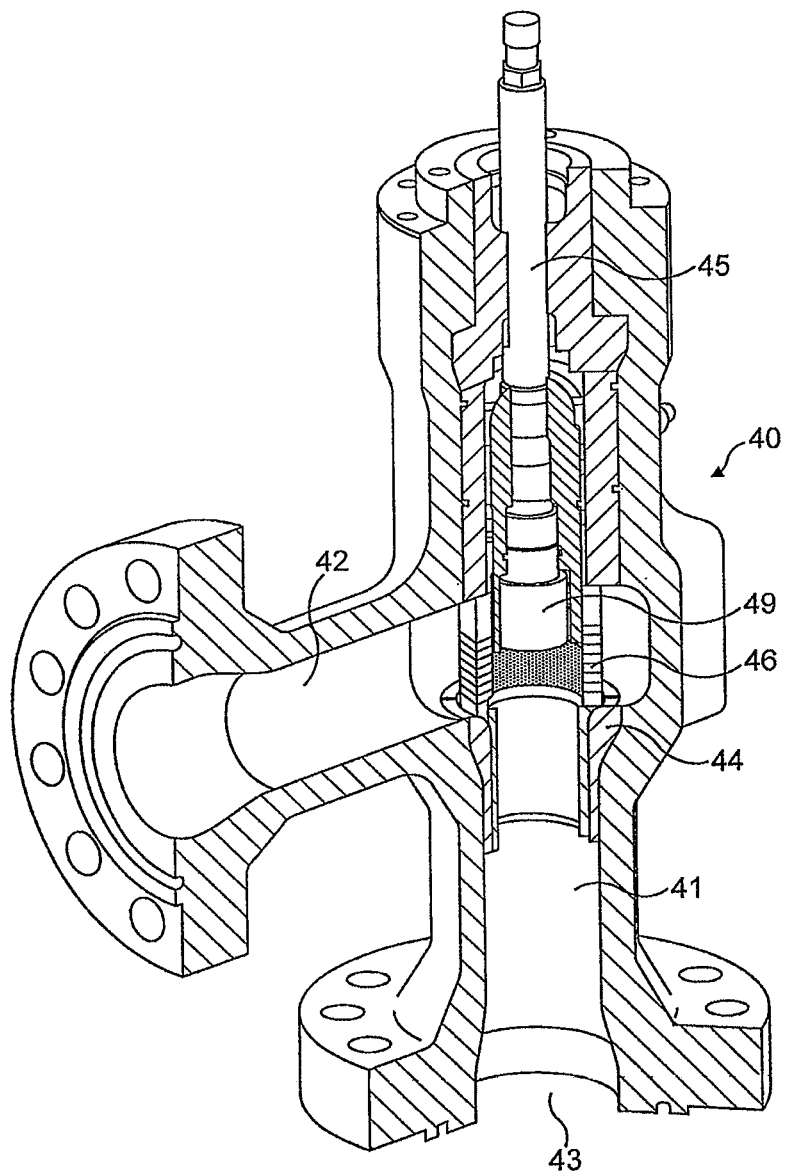
FIG. 6 is a cut-away perspective drawing of an angled control valve.
Figure 7:
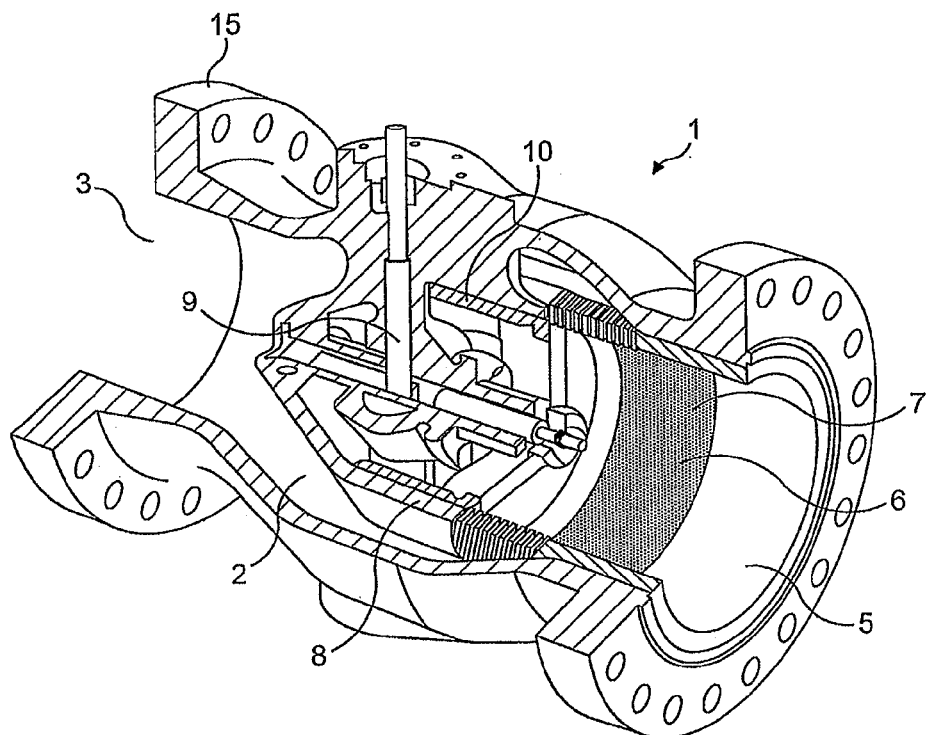
FIG. 7 is a cut-away perspective drawing of part of an inline control valve of similar structure to that of FIG. 1.

FIGS. 6 and 7 show conventional plug and cage valves produced by Mokveld Valves BV and are reproduced herein with that company's permission. These two Figures thus do not in fact show tangentially oriented apertures in the cage, and indeed such orientation would not be discernible from the Figures. However, these two Figures are included as they conveniently show other structural features which preferably are present in the valves of the invention. The following description of the Figures should thus be read as if these two Figures showed cages with apertures having the desired tangential and/or axial orientation.

Figure 1:
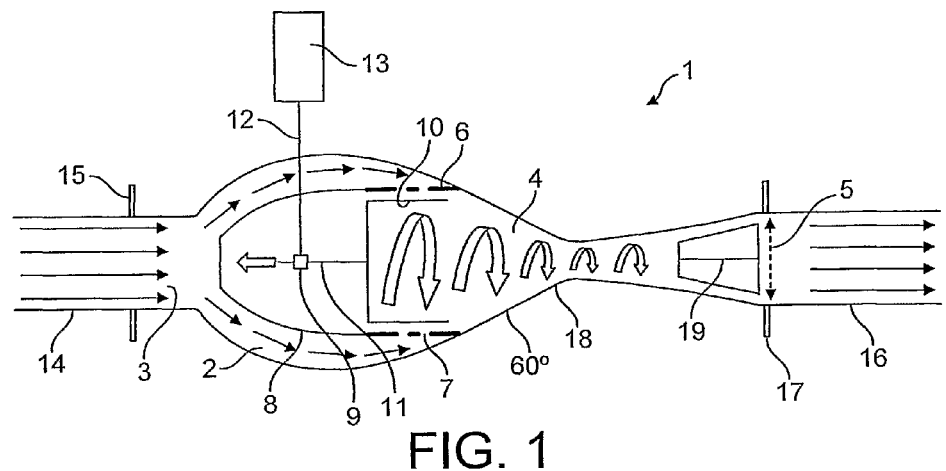
FIG. 1 is a schematic longitudinal cross-section through a first valve according to the invention.

Referring to FIGS. 1 and 7 there is shown a control valve 1 having a cylindrical inlet chamber 2 with an axially positioned fluid inlet aperture 3 and having a coaxial waisted cylindrical outlet chamber 4 (not shown in FIG. 7) with an axially positioned fluid outlet aperture 5.

Within the inlet chamber 2 is located a coaxial cylindrical cage 6 opening at one end into outlet chamber 4. The cage 6 has a plurality of tangential valve apertures 7 in its side wall. The end of cage 6 remote from outlet chamber is closed by casing 8 which contains a transmission unit 9 arranged to move plug 10 along within the cage to seal or unseal the valve apertures by moving piston rod 11 axially. Transmission unit 9 operates to transform rotational or axial motion of stem 12 produced by external drive motor 13 into axial motion of the piston rod.

Where a housing, such as housing 8, is present in the inlet chamber, the upstream end is preferably conical to facilitate fluid flow thereover.

Inlet aperture 3 is attached to inlet pipe 14 at flange 15. Outlet aperture 5 is attached to outlet pipe 16 at flange 17. Inlet and outlet pipes 14 and 16 as shown have the same internal diameter.

The internal surface of outlet chamber 4 upstream of waist 18 is at 30° to the axis of the chamber in the axial direction, i.e. the cone angle is 60°. Downstream of the waist the angle varies smoothly.

Within the downstream end of outlet chamber is disposed a vortex breaker 19.

Figure 2:
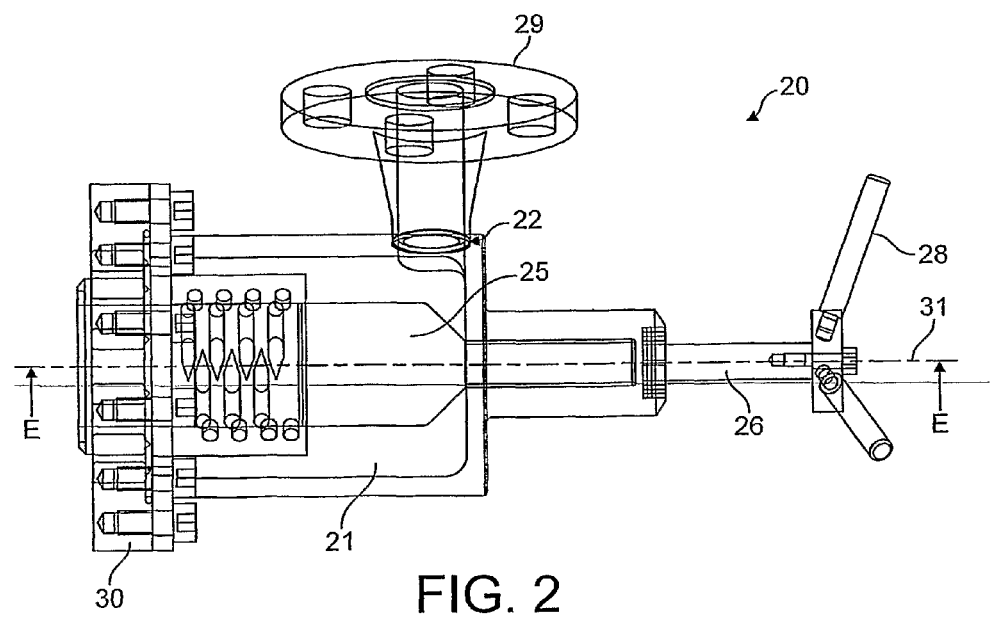
FIG. 2 is a longitudinal cross-section through a second valve according to the invention omitting the outlet chamber.
Figure 3:
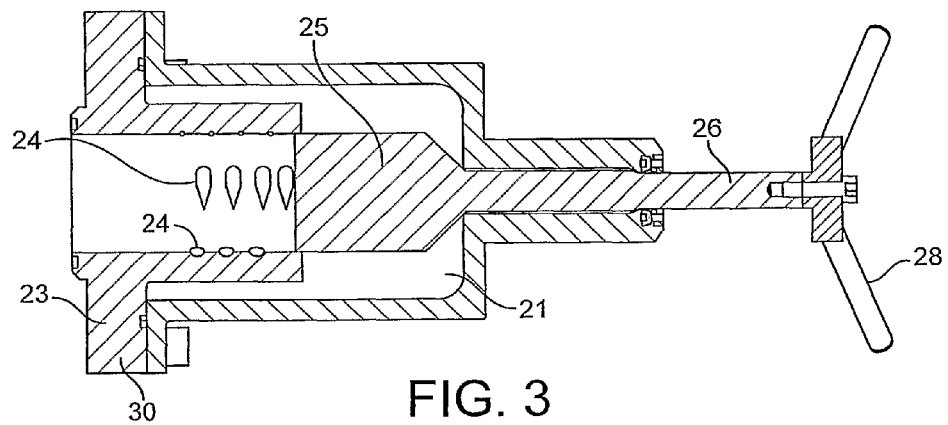
FIG. 3 is a longitudinal view of the valve of FIG. 2.
Figure 4:
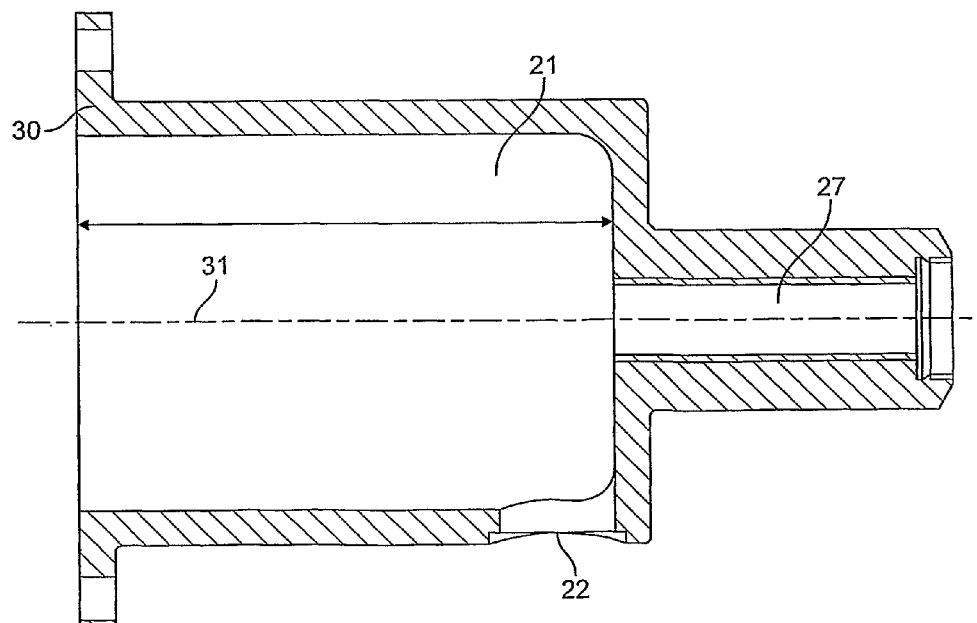
FIG. 4 is a longitudinal cross-section through the inlet chamber of the valve of FIG. 2.

Referring to FIGS. 2 to 4 there is shown a control valve 20 having a cylindrical inlet chamber 21 with an inlet aperture 22 in the side wall and containing an open-ended cylindrical coaxial cage 23 the downstream end of which is attached to an outlet chamber (not shown) via flange 30. The cylindrical axis (31) of the cage-and inlet chamber is shown. The cage and the inlet chamber are also attached via flanges 30. Tangentially oriented apertures 24 in the side wall of cage 23 allow fluid to pass from the inlet chamber to the outlet chamber. Within cage 23 is disposed cylindrical plug 25 mounted on piston 26 which passes through a piston aperture 27 in the end wall of the inlet chamber. The piston and the piston aperture are threaded so that turning handle 28 on piston 26 causes plug 25 to cover or uncover the tangentially oriented apertures 24 in the cage wall. An inlet pipe (not shown) may be attached to flange 29 on the exterior of the inlet chamber to introduce fluid into the valve through inlet aperture 22.

Figure 5:
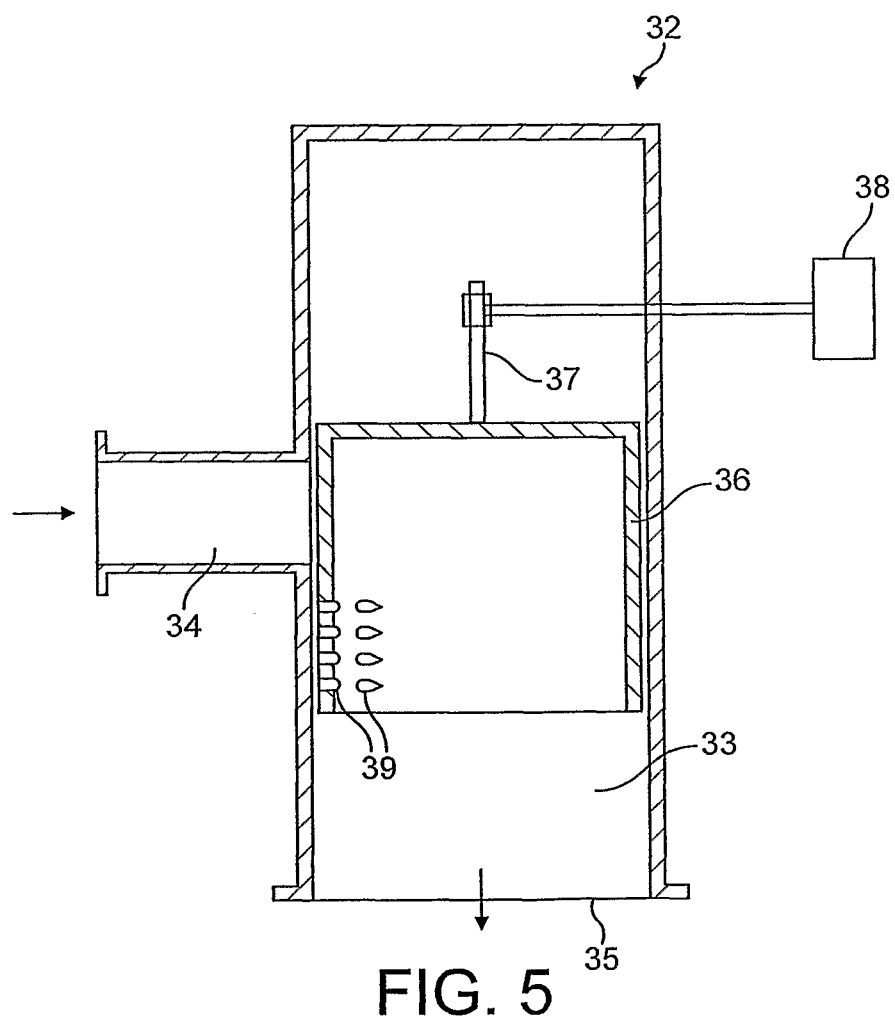
FIG. 5 is a longitudinal cross-section through a control valve according to the invention.

Referring to FIG. 5 there is shown a control valve 32 having a cylindrical inlet chamber 33 provided with an inlet aperture 34 in its side wall and an outlet aperture 35 at one end. Within chamber 33 is disposed an open ended plug-and-cage cylinder 36 attached via piston 37 to a drive motor 38. In the side wall of the plug-and-cage cylinder at the downstream end thereof are tangentially oriented valve apertures 39. Movement of the plug-and-cage cylinder in the downstream direction causes the valve apertures 39 and inlet aperture 34 to move out of alignment thus preventing fluid flow through the valve.

Referring to FIG. 6, there is shown a control valve 40 having a cylindrical inlet chamber 41 provided with a non-tangential inlet aperture 42 in its side wall and an outlet aperture 43 at one end. Within chamber 41 is disposed a fixed cage cylinder 44 and a movable plug cylinder 49 attached via piston 45 to a drive motor (not shown). In the side wall of the cage section of cage cylinder 44 are tangentially oriented valve apertures 46. Movement of the plug cylinder 49 in the upstream direction under the operation of piston 45 permits fluid to pass from the inlet aperture, through the valve apertures and out through the outlet aperture.

Figure 8:
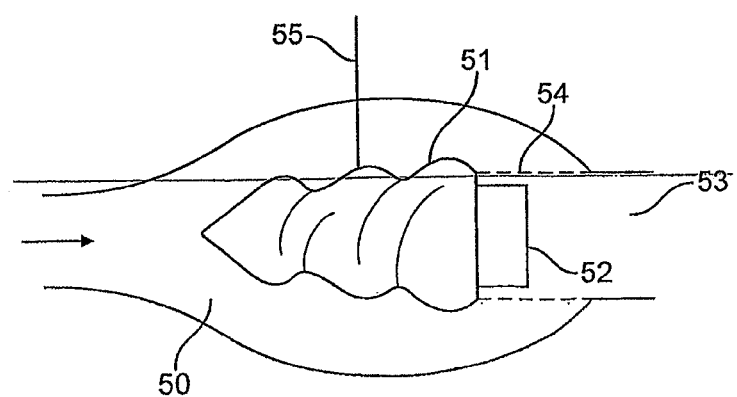
FIG. 8 is a schematic view of a control valve in which fluid entering axially is given a rotational motion upstream of the plug and cage.

Referring to FIG. 8 there is shown a partial cut-away view of a plug and cage control valve having an inlet chamber 50 containing a housing 51 itself containing a transmission unit for driving plug 52. Inlet chamber 50 communicates with outlet chamber 53 via a fixed radially or tangentially apertured cage 54. Rotational movement of stem 55 is transformed into axial movement of plug 52 as in the valve of FIGS. 1 and 7. Fluid entering inlet chamber 50 is provided with rotational movement by the spirally shaped surface of housing 51 before passing through cage 54.

The invention claimed is:

1. A fluid flow control valve comprising a cylindrical inlet chamber having a fluid inlet aperture and a coaxial waisted cylindrical outlet chamber having a fluid outlet aperture, said inlet chamber containing a coaxial cylindrical cage opening into said outlet chamber and said cage having in its cylinder wall at least one valve aperture to allow fluid to pass from said fluid inlet aperture into said outlet chamber, said control valve further comprising a coaxial cylindrical plug movable axially relative to said cage to close and open said valve aperture and a valve actuator operable to move said plug or cage relative to each other whereby to close or open said valve aperture, wherein said valve aperture is arranged to provide fluid exiting said cage from said inlet chamber with a velocity component tangential to the cylindrical axis of said cage, wherein a vortex breaker is positioned in said outlet chamber downstream of the waisted portion thereof.

2. A valve as claimed in claim 1, wherein said fluid inlet aperture and said fluid outlet aperture are substantially coaxial with said inlet and outlet chambers.

3. A valve as claimed in claim 1, wherein said outlet chamber is substantially free from intrusive structural elements in the fluid flow path from said cage to the waisted portion of said outlet chamber.

4. A valve as claimed in claim 1, wherein the inlet aperture and/or inlet chamber are so formed that fluid flowing from said inlet aperture to said valve aperture is given a velocity component tangential to the cylindrical axis of said coaxial cylindrical cage.

5. A valve as claimed in claim 1, wherein said valve aperture is both axially and tangentially oriented relative to the cylindrical axis of said cage.

6. A valve as claimed in claim 1, wherein said vortex breaker comprises radially and axially extending vanes the fluid impact surfaces whereof are at a progressively decreasing angle relative to the axis of said outlet chamber from the end proximal to said cage to the end distal to said cage.

7. A valve as claimed in claim 1, wherein the angle between the flow axis through said valve aperture in the plane perpendicular to the axis of said cage and the radius from the axis of said cage to the center of said valve aperture at the wall of said cage is 35 to 88°.

8. A valve as claimed in claim 1, wherein the angle between the flow axis through said valve aperture and a plane perpendicular to the axis of said cage at the centers of said valve aperture at the wall of said cage is 5 to 70°.

* * * * *